Figure 1:
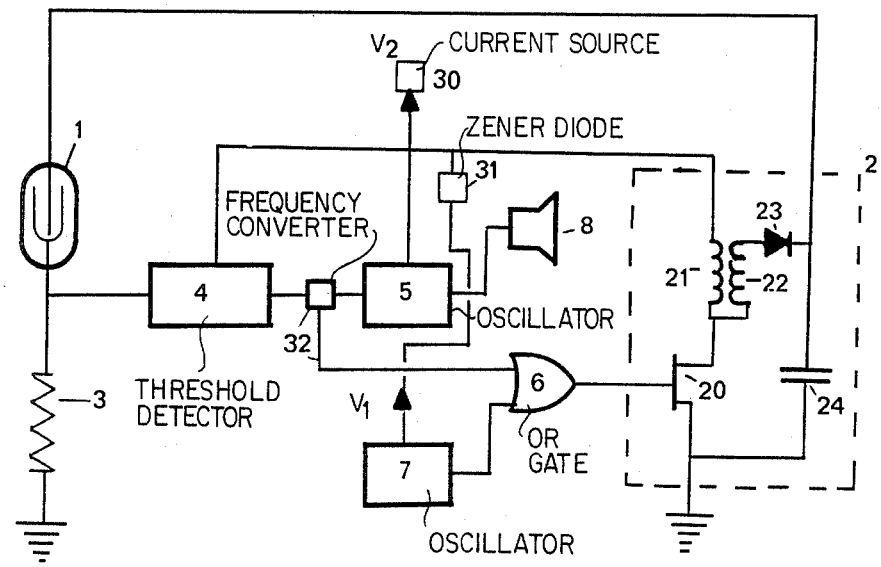

United States Patent [19]

Lewiner et al.

[11] Patent Number: 4,546,257
[45] Date of Patent: Oct. 8, 1985

[54] DEVICES FOR MEASURING IONIZING RADIATIONS

[76] Inventors: Jacques Lewiner, 5 rue Bory d'Arnex, 92210 Saint Cloud; Didier Perino, 10 rue de Bellevue, 92150 Suresnes; Claude Hennion, 18 rue Flatters, 75005 Paris, all of France

[21] Appl. No.: 543,320

[22] Filed: Oct. 19, 1983

[30] Foreign Application Priority Data

Oct. 19, 1982 [FR] France .............................. 82 17498

[51] Int. Cl.⁴ .............................................. G01T 1/18
[52] U.S. Cl. ..................................... 250/388; 250/374
[58] Field of Search ................ 250/388, 374, 375, 387

[56] References Cited

U.S. PATENT DOCUMENTS 3,428,807  2/1969  Jones et al. ......................... 250/387
4,417,217  11/1983  Sugiyama ...................... 250/387 X

OTHER PUBLICATIONS

Electronic Engineering, Jul. 1979, vol. 51, No. 625 (Harris).

Primary Examiner—Alfred E. Smith
Assistant Examiner—Carolyn E. Fields
Attorney, Agent, or Firm—Larson and Taylor

[57] ABSTRACT

The invention provides a device for measuring ionizing radiations, comprising a Geiger-Muller tube (1) whose high supply voltage is obtained from pulses which are emitted (by 6,7) at a constant relatively low frequency as long as a predetermined threshold is not exceeded by the intensity of the radiation and (by 6,7,4 and 32) at an increasing frequency depending on the output of the tube, after said threshold has been exceeded. Thus, alarm dosimeters having very long independent operation may be formed.

7 Claims, 3 Drawing Figures

DEVICES FOR MEASURING IONIZING RADIATIONS

The invention relates to devices for measuring ionizing radiations, or at least for detecting when the intensity of such radiations exceeds a predetermined threshold.

The invention relates more particularly, among the measuring devices of the above kind, to those which are portable and which use an ionization chamber or "tube" of the Geiger-Muller type as ionizing radiation sensor. Such tubes, commonly called GM tubes, require a high voltage power supply. Since the known circuits for providing this high voltage require a high supply current, the devices of the kind in question known up to present have the drawback of being relatively complicated, and thus expensive, and especially of having a reduced independent running time. Thus, the consumption of these circuits is typically greater than a few milliamps, which only gives an independent running time of a few hundred hours for devices supplied with power from current batteries, and would lead to very cumbersome and heavy devices if it was desired to increase their independent operating time to a few months, even a few years. Now, for increased use of these apparatus in the general public field, made necessary by the considerable development in nuclear energy, nuclear medecine, radiotherapy techniques and non destructive applications, such an independent operating time associated with a low cost becomes of prime importance.

A Geiger-Muller tube is an element having a very high impedance when it is not subjected to irradiation. Consequently, it has been proposed, in order to maintain at the terminals of such a tube a high voltage compatible with its proper operation, to apply a high voltage for a brief time to a capacitor connected to the electrodes of said tube, at a repetition frequency which depends only on the leakage characteristics of the capacitor. Such a device offers an extremely reduced consumption with respect to conventional arrangements where the high voltage is produced and applied permanently to the GM tube. However, with irradiation, the impedance of the GM tube decreases considerably and the voltage which is applied thereto becomes rapidly less than the minimum value for correct operation thereof.

The invention remedies this drawback in a particularly efficient and economic way. In addition, it uses in a particularly advantageous way a combination of different elements known per se, so that the high voltage is produced by a circuit comprising a minimum number of components and requiring an extremely small supply current.

To this end, the devices in accordance with the invention comprise, grouped together in the same case, an ionizing radiation detector tube of the Geiger-Muller type, an independent DC electric source of the battery or accumulator type, means supplied by this source and adapted to generate high voltage pulses, rectifier means for transforming these pulses into a high DC voltage for supplying the Geiger-Muller tube with power and means associated with this tube adapted for detecting when the intensity of the ionizing radiation applied to said tube overshoots a predetermined threshold and then to trigger off an alarm signal when such an overshoot occurs and they are essentially characterized in that the means for generating the pulses comprise, on the one hand, a pulse generator supplied with a DC voltage $V_1$ and formed by inverters of the CMOS type and, on the other hand, a converter supplied with a DC voltage $V_2$ greater than $V_1$ for amplifying the pulses from the generator, the voltages $V_1$ and $V_2$ both being provided from the source, and in that the whole is arranged so that the repetition frequency of the above different pulses is low as long as the above threshold has not been exceeded by the ionizing radiation and increases, on the contrary, in connection with the output of the Geiger-Muller tube, when this threshold is exceeded.

In preferred embodiments, recourse is further had to one and/or other of the following arrangements:

the pulse generator comprises an oscillator independent of the Geiger-Muller tube, an OR gate one of whose inputs is supplied by this oscillator and whose output is connected to the converter and means for causing the output put of the Geiger-Muller tube to act on the second input of the gate, in a device according to the preceding paragraph, the alarm signal generated from the output of the Geiger-Muller tube is formed of pulses whose frequency varies in the same direction as the intensity of the ionizing radiation and the means for causing the output of the tube to act on the second input of the gate comprise an electric connection between the second input and a point, in the alarm circuit, where said pulses forming the alarm signal are present, possibly through a frequency changer, in a device of the kind in question, in which the alarm signal generated from the output of the Geiger-Muller tube is formed of pulses whose frequency varies in the same direction as the ionizing radiation intensity, the pulse generator comprises an oscillator connected to the output of the Geiger-Muller tube, more especially through a divider bridge, this oscillator being used for supplying pulses both to the converter and to the circuit elaborating the alarm signal.

The invention comprises, apart from these main arrangements, certain other arrangements which are preferably used at the same time and which will be discussed more explicitly hereafter.

In what follows, some preferred embodiments of the invention will be described with reference to the accompanying drawings, in a way which is of course in no wise limiting.

Figure 2:
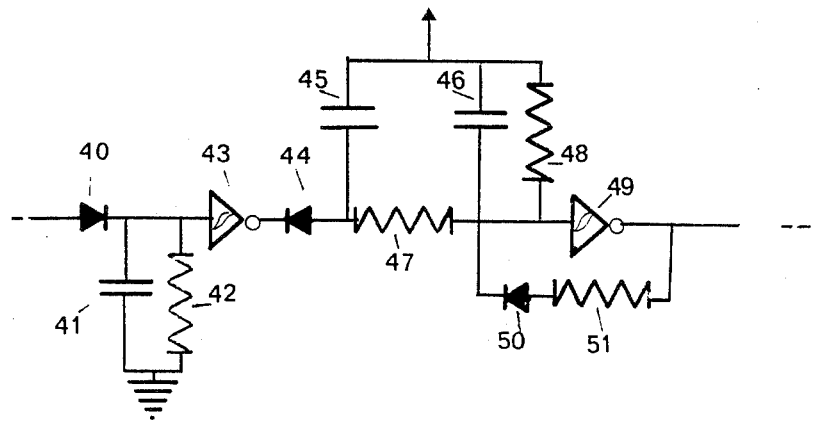
Figure 3:
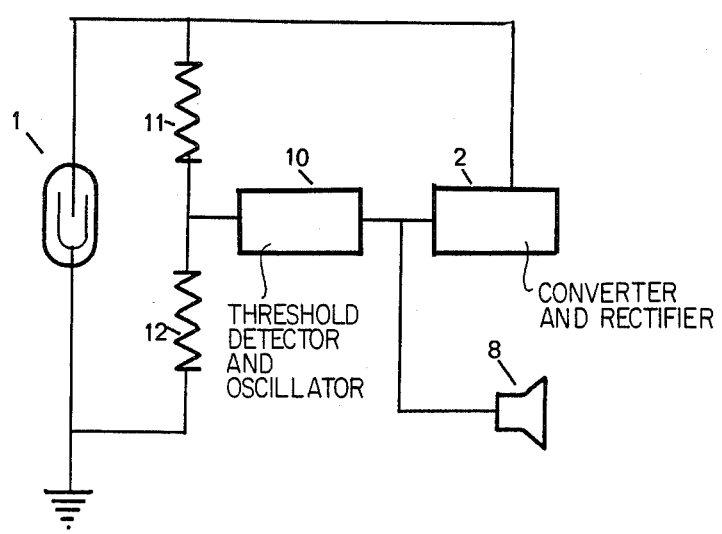

FIG. 1, of these drawings, shows schematically a device in accordance with the invention;

FIG. 2 is a diagram of a detector detecting the overshooting of the irradiation threshold forming part of the above device; and FIG. 3 shows a variant of the device in accordance with the invention.

The device of FIG. 1 comprises a GM tube connected, on the one hand, to a converter and rectifier circuit 2 and, on the other hand, to ground through a resistor 3. In the presence of ionizing radiation, the discharges in the tube cause the appearance at the terminals of resistor 3 of voltage pulses which are fed to a threshold detector circuit 4. The purpose of this circuit 4 is to integrate these pulses and to control an oscillator 5 as soon as the frequency of appearance of these pulses exceeds a certain value, which corresponds to the intensity of the ionizing radiation exceeding a predetermined threshold.

Circuit 4 is connected, on the one hand, through means 32 comprising more especially a frequency changer, to a gate 6 of the "OR" type whose other input is connected to an oscillator circuit 7 and whose output is connected to circuit 2.

Oscillator 5 feeds a sound warning device 8 which emits alarm signals.

In the absence of irradiation, only oscillator 7 is operating and feeds pulses to the converter and rectifier circuit 2 through gate 6. Circuit 2 transforms these pulses into a high DC voltage which feeds the GM tube 1. Circuit 2 comprises a field effect transistor 20, a self induction coil comprising a primary winding 21 and a secondary winding 22, a rectifier diode 23 and a capacitor 24. The two windings 21 and 22 have a common point connected to the drain of transistor 20. The other end of winding 21 is connected to an electric current source 30 delivering a voltage $V_2$, which also supplies circuits 4 and 5. When the pulses from gate 6 are applied to the grid of transistor 20, a current flows through winding 21 and, when transistor 20 is locked, on the falling edge of the pulse, there appears at the terminals of winding 21 a voltage surge which itself induces a voltage in winding 22. The two voltages are added together and charge the capacitor 24 to a value all the higher the greater the surge voltage produced in winding 21 and the higher the ratio of the number of turns of winding 22 to the number of turns of winding 21. Since the surge voltage produced in winding 21 is only limited by the avalanche voltage of transistor 20, it is particularly advantageous to use for this latter an MOS power transistor of a type withstanding a high avalanche current. Such transistors, for example of the SIPMOS or VMOS type present avalanche voltages of several hundred volts.

In the absence of irradiation, tube 1 behaves like a practically infinite resistor so that capacitor 24 keeps its charge for a period of time which only depends on its leak resistance and its capacity. The frequency of the pulses delivered by the oscillator circuit 7 must then be calculated so that the charge voltage of capacitor 24 always remains greater than the minimum value ensuring correct operation of the GM tube 1.

In the presence of ionizing radiation, and if the predetermined radiation intensity threshold is exceeded, circuit 4 controls oscillator 5 by feeding thereto pulses whose frequency depends on the radiation intensity. These pulses are also fed to circuit 2 and contribute to recharging the capacitor 24. Consequently, when the ionizing radiation intensity increases, the recharging rate of capacitor 24 also increases, which allows the GM tube 1 to be constantly supplied with a suitable voltage. Therefore, the consumption of the assembly is small in the stand-by period and adjusted, during a period of radiation, so as to maintain the supply voltage for the GM tube at its optimum value.

To optimize this consumption, the oscillator circuit 7 is formed from CMOS type inverters. Such inverters have a very low consumption, of the order of a microamp, as long as their supply voltage does not exceed about 4 volts. But such a value is not sufficient in so far as the supply voltage $V_2$ of the rest of the circuit, particularly the converter and rectifier circuit 2, is concerned. In devices in accordance with the invention, this problem is solved by supplying the oscillator circuit 7 from the source 30 of voltage $V_2$, but through resistors or, better still, a Zener diode 31 placed in series, whose regulated voltage drop is obtained by a current of only a few microamps passing therethrough. Such diodes are at present available and thus circuit 7 is supplied with a voltage $V_1$ less than $V_2$, allowing a minimum consumption for this circuit.

FIG. 2 shows one very simple embodiment of the threshold detector circuit 4. This circuit comprises a diode 40, a capacitor 41 and a resistor 42 arranged so as to widen the voltage pulses which appear at the terminals of resistor 3, which is connected to the anode of diode 40. These widened pulses are applied to the input of a inverter 43 having a threshold for triggering on the rising edge of the pulse greater than the threshold for triggering on the falling edge, which supplies an integrator circuit formed of a diode 44, capacitors 45 and 46 and resistors 47 and 48, arranged so that the voltage applied to the input of an inverter 49, of the same type as inverter 43, causes switching thereof as soon as the frequency of the pulses exceeds a predetermined value. When inverter 49 switches, the capacitor 46 discharges through a diode 50 and a resistor 51 and the inverter 49 switches back again. Circuit 4 delivers then at its output a pulse whose width depends on the capacity of capacitor 4 and on resistor 51. The circuit 4 behaves then like a frequency divider which only operates for a frequency greater than a given threshold. The value of this threshold depends on the value of resistor 48 and on the capacity of capacitor 46, whereas the division ratio depends on the ratio of the values of the capacitors 45 and 46. Since the frequency of the pulses which appear at the terminals of resistor 3 is directly linked to the intensity of the ionizing radiation, the detection threshold of the device may be adjusted by modifying the value of capacitors 45 and 46 and that of resistor 48.

In the variant of FIG. 3, we find again the GM tube 1, the converter-rectifier circuit 2, the sound warning device 8, but these last two elements are controlled by the same circuit 10, which serves both as threshold detector and oscillator. A divider bridge, formed of very high value resistors 11 and 12 is connected in parallel across the GM tube 1, and the common point between resistors 11 and 12 is connected to the input of circuit 10. This circuit 10 is adapted so that it delivers a train of pulses whenever the high voltage supplying the GM tube 1 drops below a predetermined value.

In the absence of radiation, the natural discharge of capacitor 24 of circuit 2 is slow, and the repetition frequency of the emission of the pulse trains delivered by circuit 10 is low. Since circuit 10 controls directly the warning device 8, the successive recharges of capacitor 4 cause the emission of a sound signal which may serve as an indicator of the correct operation of the device. When the intensity of the ionizing radiation increases, capacitor 24 is discharged more rapidly through the GM tube 1 which has then become conducting and the repetition frequency of the emission of the pulse trains delivered by circuit 10 increases, as well as the repetition frequency of the sound signals. In a variant not shown, the warning device 8 is controlled by circuit 10 through a threshold frequency divider circuit similar to the one shown in FIG. 2. In this variant, the device no longer emits sound signals in the absence of irradiation but only when the radiation intensity threshold is exceeded.

In a non illustrated variant of the device, which may be either of the type shown in FIG. 1 or of the type shown in FIG. 3, the sound warning device 8 is formed by a piezo-ceramic transducer connected in series with a self induction coil in parallel with a transistor. When the transistor ceases conducting, the surge voltage caused at the terminals of the self induction coil amplifies considerably the sound intensity emitted by the transducer. Such an arrangement allows a very intense sound signal to be obtained with a low circuit supply voltage and a low consumption.

Following which, and whatever the embodiment adopted, a measuring device is finally obtained whose construction and operation follow sufficiently from what has gone before.

This device presents numerous advantages with respect to those known heretofore, more especially in so far as independence of operation is concerned, which is very important. In fact, a device in accordance with the invention consumes typically 10 microamps for its power supply which, combined with the use of current miniature battery cells of a small capacity of 90 milliamp-hour, provides a year's operation.

Moreover, the reduced number of components used in its construction makes it very inexpensive and allows these devices to be widely used.

We claim:

1. A device for measuring ionizing radiations, comprising a tube of the Geiger-Muller type, an independent source of DC electric current, pulse generating means connected to said source for generating high voltage pulses, rectifier means for transforming said pulses into a high DC voltage for supplying the Geiger-Muller tube, and means connected to said Geiger-Muller tube for detecting when the ionizing radiation intensity applied to said tube exceeds a predetermined threshold and for activating an alarm circuit to produce an alarm signal when said threshold is exceeded, said pulse generating means comprising a pulse generator supplied with a DC voltage $V_1$ and comprising inverters of the CMOS type, and a converter, supplied with a DC voltage $V_2$ greater than $V_1$, for amplifying the pulses from the pulse generator, the voltages $V_1$ and $V_2$ both being derived from said source, and said pulse generating means generating pulses at a first, relatively low repetition frequency when the ionizing radiation is below said threshold and generating pulses at a repetition frequency related to the output of the Geiger-Muller tube when the ionizing radiation exceeds said threshold.

2. The device according to claim 1 wherein said pulse generator comprises an oscillator independent of the Geiger-Muller tube, an OR gate one input of which is connected to said oscillator and whose output is connected to the converter, and means for connecting the output of the Geiger-Muller tube to the second input of the gate.

3. The device according to claim 2, wherein said alarm signal comprises pulses whose frequency varies in the same direction as the intensity of the ionizing radiation and wherein the means for connecting the output of the tube to the second input of the gate comprises an electrical connection between said second input and a point in the alarm circuit where said pulses forming the alarm signal are present.

4. The device according to claim 3 wherein said electrical connection includes a frequency converter.

5. The device according to claim 1, wherein the alarm signal generated from the output of the Geiger-Muller tube is formed of pulses whose frequency varies in the same direction as the intensity of the ionizing radiation, and wherein said pulse generator comprises an oscillator connected to the output of the Geiger-Muller tube for supplying pulses both to the converter and to said alarm circuit for producing the alarm signal.

6. The device according to Claim 1, wherein the converter includes an MOS transistor whose avalanche voltage exceeds 100 V.

7. The device according to Claim 1, wherein the threshold detecting means comprises at least one MOS circuit incorporating inverters providing a threshold triggering on the rising edge of the pulse greater than the threshold triggering on the falling edge.

* * * * *